Feb. 10, 1942.  T. JAASUND ET AL  2,272,805
DRAWKNIFE
Filed Sept. 9, 1939
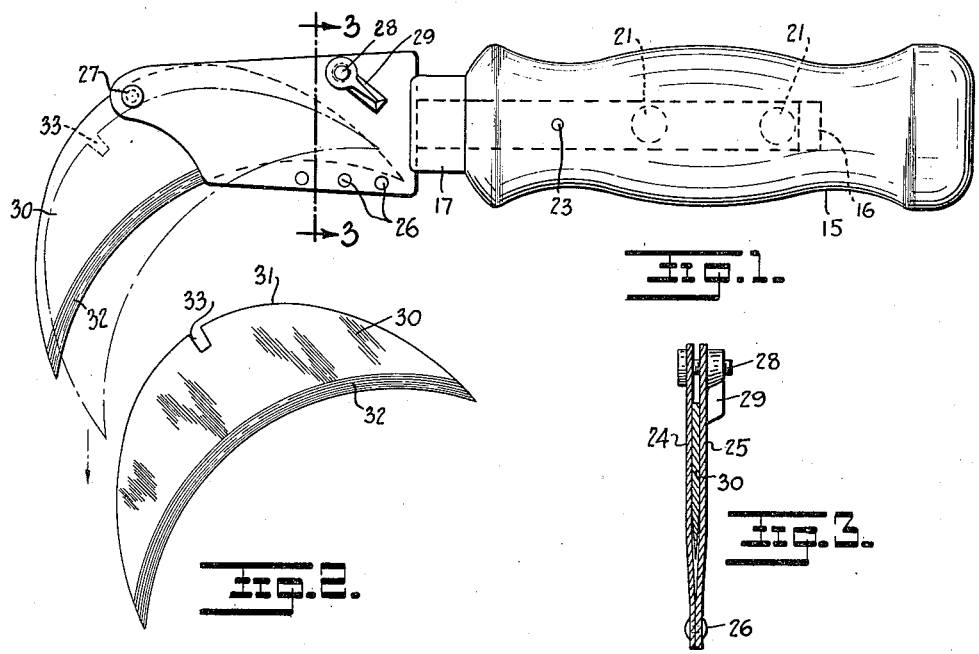
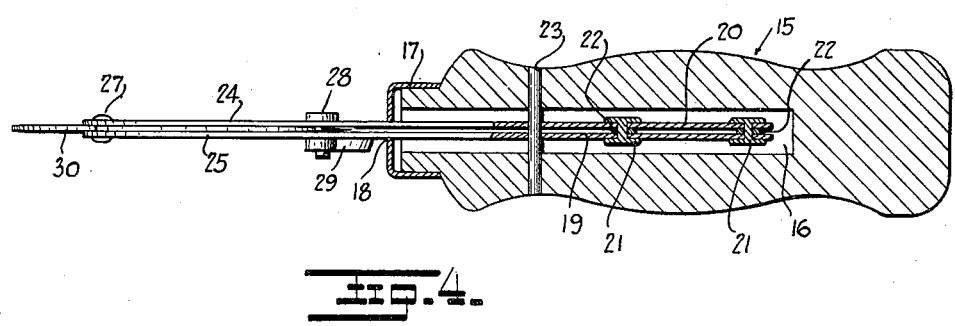
INVENTORS.
TORKEL JAASUND.
MAGNE HETLAND.
BY
ATTORNEY.

Patented Feb. 10, 1942

2,272,805

UNITED STATES PATENT OFFICE 2,272,805

DRAWKNIFE

Torkel Jaasund, New York, and Magne Hetland, West New Brighton, N. Y.

Application September 9, 1939, Serial No. 294,078

1 Claim. (Cl. 30—317)

This invention relates to cutting knives adapted to be used by one hand of an operator, by a drawing or pulling action, and is particularly designed for cutting linoleum and like sheet material.

One of the objects of the invention is to provide an efficient manually operable knife having a handle suited to be firmly grasped, a shank terminating in a sheath, and a blade, operable by a pulling stroke, secured in the sheath.

A further feature is in the provision of a single bladed draw knife, of novel shape, capable of reversal within its holder, or removal and substitution in an unusually easy and effective manner, no tools being required.

Another purpose is to produce a knife having a crescent shaped blade, instantly reversible, easily sharpened and highly effective in operation.

These and other analogous aims are accomplished by the novel and characteristic construction, combination and arrangement of few and simple parts hereinafter described and illustrated in the annexed drawing, constituting a component of this disclosure, and in which:

Figure 1 is a side elevational view of an embodiment of the invention, showing, in broken lines, the knife as partially detached.

Figure 2 is a plan view of the blade in detail.

Figure 3 is a transverse sectional view taken on line 3—3 of Figure 1, drawn to an enlarged scale.

Figure 4 is a top plan view of the device, the handle and shank shown in longitudinal section.

Referring in greater detail to the drawing, the handle, generally designated by the numeral 15, is shaped in a manner to be conveniently grasped in a person's hand to afford a firm grip.

In the handle is an elongated opening 16, partially covered at its inner end by a tight fitted ferrule 17 through which the shank 18 passes.

This shank is shown as composed of two duplicate sheet metal plates 19—20 united by rivets 21 and held rigidly by thin spacers 22. A pin 23, set in the handle, passes through both elements of the shank and holds them firmly therein.

Integrally extending from the shank, adjacent the ferrule 17 are plates 24—25, constituting a holder or sheath, the plates being united along their lower edges by a series of rivets 26 as shown, and are open at their upper and front edges.

Set in the front, upper ends of the plates is a riveted pin 27, and rearward thereof is the head of a fixed screw 28, passing through both plates and provided, on its outer extending end, with a threaded, finger operable lever 29 by which the plates may be forcibly drawn towards each other.

The blade 30, shown in detail in Figure 2, is crescent shaped in profile, having a curved back 31 and a concave cutting edge 32 easily resharpened.

Midway in the back 31 is a notch 33 adapted to engage the pin 27, between the plates 24—25, and pivot thereon into such adjustment as may be desired, whereupon it may be rigidly clamped by the finger lever 29.

From the foregoing it will be apparent that upon relaxing the clamp, the blade may be wholly removed, turned end for end or a fresh blade substituted.

Obviously the blade may be secured at any preferred angle, relative to the handle, pivoting on the pin 27, and the knife operated by a drawing or pulling movement.

Although the foregoing is generally descriptive of the best known embodiment of the invention, it is to be understood that it is not restrictive, as obviously, many minor changes may be made without departing from the scope and tenor of the appended claim.

Having thus described the invention and set forth the manner of its construction and use, what is claimed as new and sought to secure by Letters Patent, is:

A draw knife comprising a single handle having an axial recess of rectangular cross section, a ferrule fixed on said handle and having a narrow slot in register with the recess, a pair of metal plates riveted together to constitute a shank fixed in said ferrule to extend into the recess, a retaining pin passed transversely through said handle and shank, said plates extending outwardly in close parallelism from said shank, a keeper pin fixed in said plates, a crescent shaped double ended blade operatively engaged between said plates and having a notch midway the length of its convexly curved rear edge to engage said keeper pin, a bolt passed through said plates outwardly beyond the edge of said blade, and a nut on said bolt having a lever handle to clamp said blade between said plates.

TORKEL JAASUND.
MAGNE HETLAND.